United States Patent
Sasaki et al.

(10) Patent No.: US 12,169,154 B2
(45) Date of Patent: Dec. 17, 2024

(54) OPTICAL APPARATUS EVALUATING METHOD

(71) Applicant: CANON KABUSHIKI KAISHA, Tokyo (JP)

(72) Inventors: Kunihiko Sasaki, Tochigi (JP); Yasuhiro Hatakeyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 17/215,848

(22) Filed: Mar. 29, 2021

(65) Prior Publication Data
US 2021/0314480 A1 Oct. 7, 2021

(30) Foreign Application Priority Data
Apr. 7, 2020 (JP) .................. 2020-068987

(51) Int. Cl.
*H04N 5/232* (2006.01)
*G01M 11/02* (2006.01)
*H04N 23/63* (2023.01)

(52) U.S. Cl.
CPC ........ *G01M 11/0257* (2013.01); *H04N 23/63* (2023.01)

(58) Field of Classification Search
CPC .. G01J 3/0218; G01B 11/2755; G01B 11/303; G01M 11/0257; H04N 5/23209; H04N 5/23293; G03B 17/14; G02B 7/021
USPC ................ 356/237.1–237.5, 124–127, 239.1
See application file for complete search history.

(56) References Cited

U.S. PATENT DOCUMENTS

| | | | |
|---|---|---|---|
| 6,677,591 B1* | 1/2004 | Kim ................... | G01M 11/0278 250/341.1 |
| 6,734,958 B1* | 5/2004 | Mackinnon ........ | A61B 1/00057 356/241.1 |
| 7,532,815 B2 | 5/2009 | Miyake | |
| 2010/0246994 A1* | 9/2010 | Sawada ................ | H04N 23/843 382/275 |
| 2010/0309342 A1* | 12/2010 | Nagata ................. | H04N 23/663 348/241 |
| 2013/0201448 A1* | 8/2013 | Nozato .................... | A61B 3/14 351/205 |
| 2015/0253456 A1* | 9/2015 | Norton ............... | G03B 21/2086 250/222.1 |
| 2016/0089023 A1* | 3/2016 | Takeno .................. | G02B 26/06 359/846 |

FOREIGN PATENT DOCUMENTS

| | | | |
|---|---|---|---|
| JP | H0650845 A | * | 2/1994 |
| JP | 2002357507 A | | 12/2002 |
| JP | 2003141283 A | | 5/2003 |
| JP | 2004171265 A | | 6/2004 |
| JP | 2006235285 A | | 9/2006 |

(Continued)

*Primary Examiner* — Hoa Q Pham
(74) *Attorney, Agent, or Firm* — ROSSI, KIMMS & McDOWELL LLP

(57) ABSTRACT

An optical apparatus evaluating method includes the steps of acquiring first data on a performance of an optical apparatus, which changes along with use of the optical apparatus, acquiring second data on a reference performance of the optical apparatus, and evaluating the performance of the optical apparatus using the first data and the second data.

10 Claims, 15 Drawing Sheets

(56) References Cited

FOREIGN PATENT DOCUMENTS

| | | | | |
|---|---|---|---|---|
| JP | 2007298910 | A | | 11/2007 |
| JP | 2013171077 | A | * | 9/2013 |
| JP | 2019037642 | A | | 3/2019 |
| KR | 101300250 | B1 | | 8/2013 |

* cited by examiner

| SUBVARIABLE INFORMATION | | Y DIRECTION | Z DIRECTION | | | | | | |
|---|---|---|---|---|---|---|---|---|---|
| | | | 1 | 2 | 3 | ... | ... | 63 | 64 |
| OPTICAL AXIS DIRECTION POSITION | X=0 | | | | | | | | |
| WAVELENGTH (COLOR) | Co=WHITE | 1 | 64 | 65 | 65 | ... | ... | 59 | 58 |
| SPATIAL FREQUENCY | f=10 | 2 | 65 | 66 | 67 | ... | ... | 61 | 59 |
| FOCAL LENGTH | Z=24 | 3 | 64 | 66 | 68 | ... | ... | 61 | 60 |
| FOCUS POSITION | Fo=∞ | ... | ... | ... | ... | ... | ... | ... | ... |
| F-NUMBER INFORMATION | Iris=2.8 | ... | ... | ... | ... | ... | ... | ... | ... |
| ORIENTATION | g=POSITIVE POSITION | ... | ... | ... | ... | ... | ... | ... | ... |
| DIRECTION | Di=SAGITTAL | ... | ... | ... | ... | ... | ... | ... | ... |
| WHETHER ADAPTER EXISTS OR NOT | Ad=NONE | 63 | 70 | 71 | 72 | ... | ... | 65 | 65 |
| DETERMINATION DATA | Disc=SHIPMENT | 64 | 70 | 72 | 72 | ... | ... | 63 | 64 |

FIG. 13

| SUBVARIABLE INFORMATION | | DRIVING FREQUENCY [Hz](f) | DIRECTION (di) | | |
|---|---|---|---|---|---|
| | | | | 0(NEAR⇌INFINITY) | 1(INFINITY⇌NEAR) |
| ENVIRONMENTAL TEMPERATURE | T=23 | 28000 | | 0 | 0 |
| ORIENTATION | g=UPTURNED | 27900 | | 0 | 0 |
| DETERMI-NATION DATA | Disc=DETER-MINATION | 27800 | | 1 | 0 |
| | | 27700 | | 2 | 1 |
| | | . | | . | . |
| | | . | | . | . |
| | | . | | . | . |
| | | 25500 | | 50 | 51 |
| | | 25400 | | 55 | 55 |
| | | 25300 | | 60 | 62 |
| | | 25200 | | 70 | 70 |
| | | 25100 | | 60 | 62 |
| | | 25000 | | 50 | 51 |

FIG. 14

| AAA' | BBB' | PERFORMANCE EVALUATION RESULT | USED PRODUCT RATING |
|---|---|---|---|
| WEIGHTED AVERAGE: MORE THAN 90 | WEIGHTED AVERAGE: MORE THAN 82 | S | NEAR MINT |
| | WEIGHTED AVERAGE: MORE THAN 75 AND LESS THAN 82 | A | NEAR MINT |
| | WEIGHTED AVERAGE: LESS THAN 75 | A | NEAR MINT |
| WEIGHTED AVERAGE: MORE THAN 82 AND LESS THAN 90 | WEIGHTED AVERAGE: MORE THAN 80 | A | NEAR MINT |
| | WEIGHTED AVERAGE: MORE THAN 75 AND LESS THAN 80 | B | LOW DETERIORATION |
| | WEIGHTED AVERAGE: LESS THAN 75 | C | HIGH DETERIORATION |
| WEIGHTED AVERAGE: LESS THAN 82 | WEIGHTED AVERAGE: MORE THAN 77 | B | LOW DETERIORATION |
| | WEIGHTED AVERAGE: MORE THAN 70 AND LESS THAN 77 | C | HIGH DETERIORATION |
| | WEIGHTED AVERAGE: LESS THAN 70 | C | HIGH DETERIORATION |

FIG. 15

| DETERMINATION EXPRESSION | PERFORMANCE EVALUATION RESULT | USED PRODUCT RATING |
|---|---|---|
| fst' =0<br>fbo' =0 | A | NEAR MINT |
| fst' >0<br>fbo' <0 | B | LOW DETERIORATION |
| fst' >0<br>fbo' >0 | C | HIGH DETERIORATION |
| fst' <0<br>fbo' >0 | C | |
| fst' <0<br>fbo' <0 | C | |

FIG. 16

OPTICAL APPARATUS EVALUATING METHOD

BACKGROUND OF THE INVENTION

Field of the Invention

The present invention relates to a technology for evaluating a performance of an optical apparatus, such as an interchangeable lens and a camera.

Description of the Related Art

The performance (quality) of the optical apparatus, such as a digital camera and an interchangeable lens for consumers, is evaluated in order to set a price of a used product and to calculate a repair cost. More specifically, Japanese Patent Laid-Open Nos. 2004-171265 and 2003-141283 disclose evaluating methods using information such as the number of uses of the optical apparatus, its appearance, the history of impacts applied to the optical apparatus, and abnormalities detected in the optical apparatus.

However, the evaluation based on the number of uses of the optical apparatus and the impact history cannot provide a result that reflects performance changes depending on a use environment such as the temperature and humidity. Moreover, a clean appearance of the optical apparatus does not necessarily guarantee that a large impact has never been applied. Although an abnormality in a mechanical driver in the optical apparatus is easily detectable, it is difficult to clearly detect an abnormality in imaging performance such as the image quality. Among consumer products as mass-produced products, even if they are brand new, performances vary due to component manufacturing errors and assembly errors.

SUMMARY OF THE INVENTION

The present invention provides an optical apparatus evaluating method or the like that can evaluate a performance of an optical apparatus with higher accuracy than ever.

An optical apparatus evaluating method according to one aspect of the present invention includes the steps of acquiring first data on a performance of an optical apparatus, which changes along with use of the optical apparatus, acquiring second data on a reference performance of the optical apparatus, and evaluating the performance of the optical apparatus using the first data and the second data.

An optical apparatus evaluating apparatus according to another aspect of the present invention includes a first acquirer configured to acquire first data on a performance of an optical apparatus, which changes along with use of the optical apparatus, a second acquirer configured to acquire second data on a reference performance of the optical apparatus, and an evaluator configured to evaluate the performance of the optical apparatus using the first data and the second data.

Further features of the present invention will become apparent from the following description of exemplary embodiments with reference to the attached drawings.

BRIEF DESCRIPTION OF THE DRAWINGS

FIG. 13 illustrates MTF % data (table data) according to this embodiment.

FIG. 14 illustrates driving speed data (table data) of the focus actuator according to this embodiment.

FIG. 15 illustrates a performance evaluating classification relating to an MTF according to this embodiment.

FIG. 16 illustrates a performance evaluating classification relating to the focus actuator according to this embodiment.

DESCRIPTION OF THE EMBODIMENTS

Figure 2:
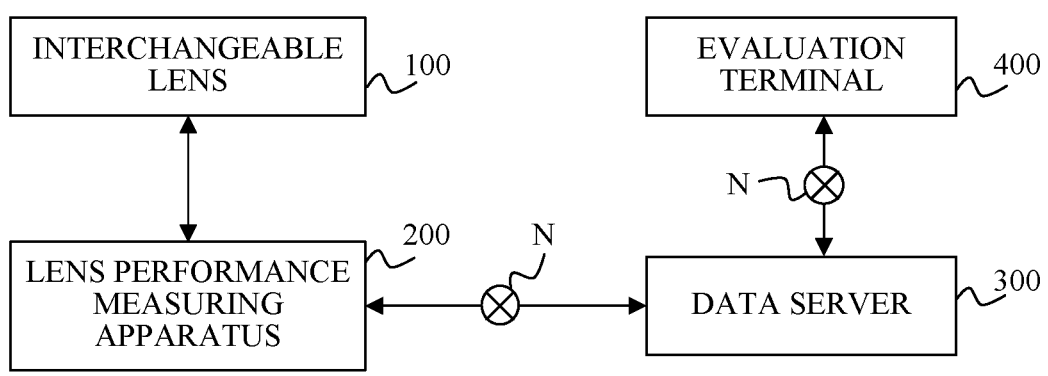
FIG. 2 illustrates a configuration of a lens evaluating system according to this embodiment.

Referring now to the accompanying drawings, a description will be given of embodiments according to the present invention. FIG. 2 illustrates a configuration of a lens evaluating system as an optical apparatus evaluating system according to one embodiment of the present invention. The lens evaluating system includes a lens performance measuring apparatus 200 configured to measure the performance of the interchangeable lens 100 as an optical apparatus, a data server 300, and an evaluation terminal 400 that serves as an optical apparatus evaluating apparatus. The lens performance measuring apparatus 200, the data server 300, and the evaluation terminal 400 can communicate with each other via a network N.

Figure 3:
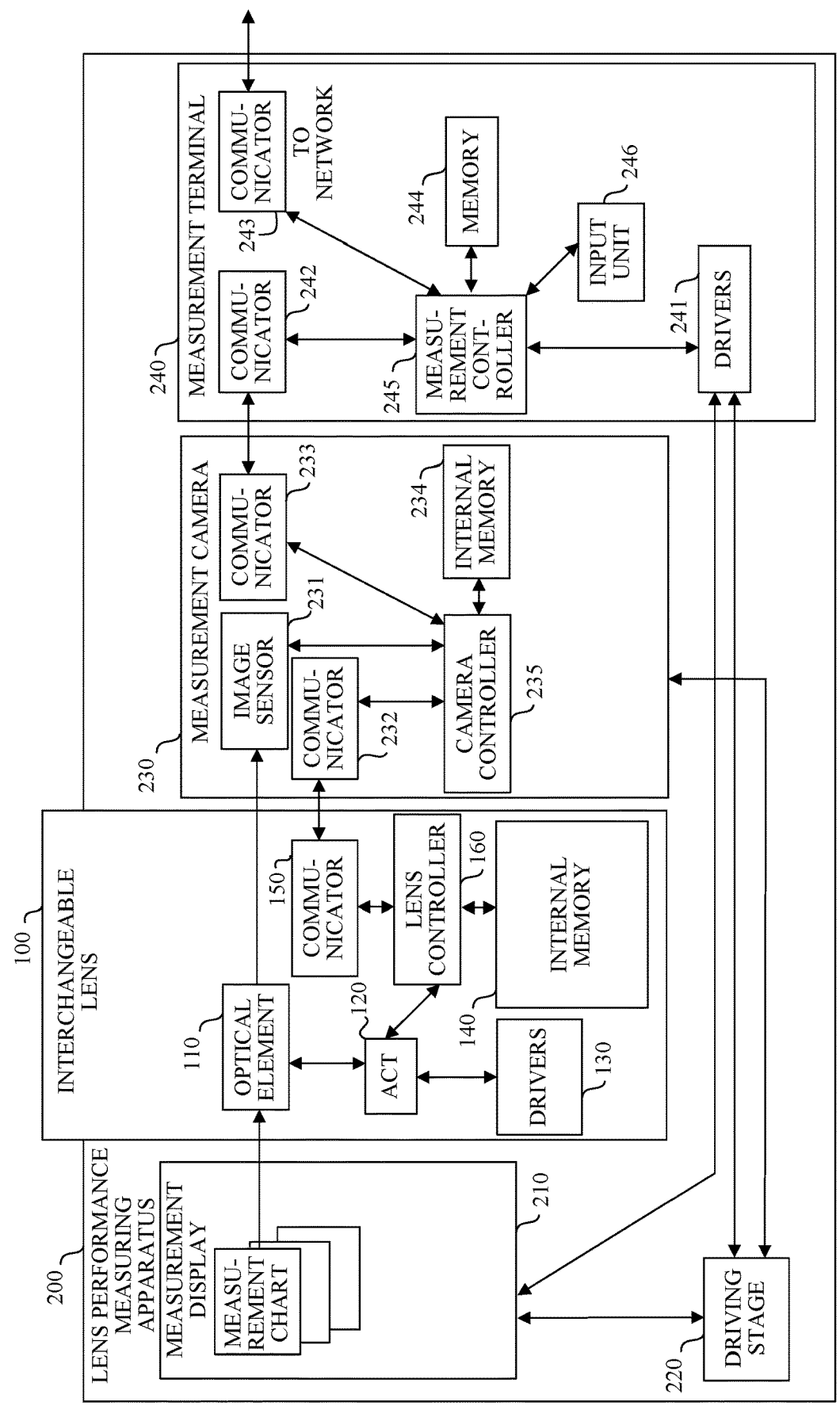
FIG. 3 illustrates structures of a lens measuring apparatus and an interchangeable lens according to this embodiment.

FIG. 3 shows detailed structures of the interchangeable lens 100 and the lens performance measuring apparatus 200. The interchangeable lens 100 includes an optical element 110 such as a magnification varying lens, a focus lens, an image stabilizing lens, and an aperture stop (diaphragm), an actuator (ACT) 120 as a mechanical driver that moves the optical element 110, a driver 130 that drives the ACT 120, an internal memory 140, a communicator 150 that communicates with a measurement camera (camera for measurement use) 230, and a lens controller 160 that controls the entire interchangeable lens 100. The internal memory 140 saves identification (ID) information used to identify an individual of the interchangeable lens 100 and various driving information used to drive the ACT 120.

The lens performance measuring apparatus 200 includes a measurement display (display (unit) for measurement use) 210, a driving stage 220, the measurement camera (image pickup apparatus) 230, and a measurement terminal 240.

The measurement display 210 displays a measurement chart (chart for measurement use) or the like according to chart display signals from various drivers 241 included in the measurement terminal 240. The interchangeable lens 100 (optical element 110) forms an image of light from the measurement chart displayed on the measurement display 210 on an image sensor 231 in the measurement camera 230.

The driving stage 220 moves the measurement camera 230 equipped with the measurement display 210 and the interchangeable lens 100 in the optical axis direction or in the direction orthogonal to the optical axis in response to stage driving signals from various drivers 241 in the measurement terminal 240 or rotates it around the optical axis or around the axis orthogonal to the optical axis. For example, in the measurement relating to the image stabilizing performance of the interchangeable lens 100, the measurement camera 230 is moved. In the measurement relating to the focus tracking performance for a moving object, the measurement display 210 is moved.

The measurement camera 230 includes the image sensor 231 such as a CCD sensor and a CMOS sensor, a communicator 232 that enables a communication with the interchangeable lens 100, a communicator 233 that enables a communication with the measurement terminal 240, an internal memory 234, and a camera controller 235. The image sensor 231 images the measurement chart displayed on the measurement display 210 via the interchangeable lens 100, and stores the image data obtained through imaging in the internal memory 234. The stored image data is transmitted to the measurement terminal 240 via the communicator 233. The camera controller 235 controls the measurement camera 230 in response to a command from the measurement terminal 240, and transmits a control command to the interchangeable lens 100.

This embodiment uses a normal lens interchangeable type camera for the measurement camera 230, but may use an image pickup apparatus dedicated to the measurement.

The measurement terminal 240 includes a communicator 242 that enables a communication with the measurement camera 230, a communicator 243 that enables a communication with the network that performs a data communication with the data server 300, a measurement memory 244, a measurement controller 245, various drivers 241, and an input unit 246. Information such as various measurement items and measurement conditions input to the input unit 246 is transmitted to the measurement controller 245. The measurement controller 245 transmits a command to the measurement camera 230 and the interchangeable lens 100 via the communicator 242 according to the input measurement item and measurement condition, and measures the performance of the interchangeable lens 100 under the measurement condition for the measurement item. The measurement controller 245 temporarily stores the performance measurement data obtained by the measurement in the measurement memory 244 in association with the ID information of the interchangeable lens 100. The stored performance measurement data is transmitted to the data server 300 via the communicator 243 and the network. The performance measurement data is data on the performance of the interchangeable lens 100, and corresponds to first data that changes along with use of the interchangeable lens 100 by the user.

Figure 4:
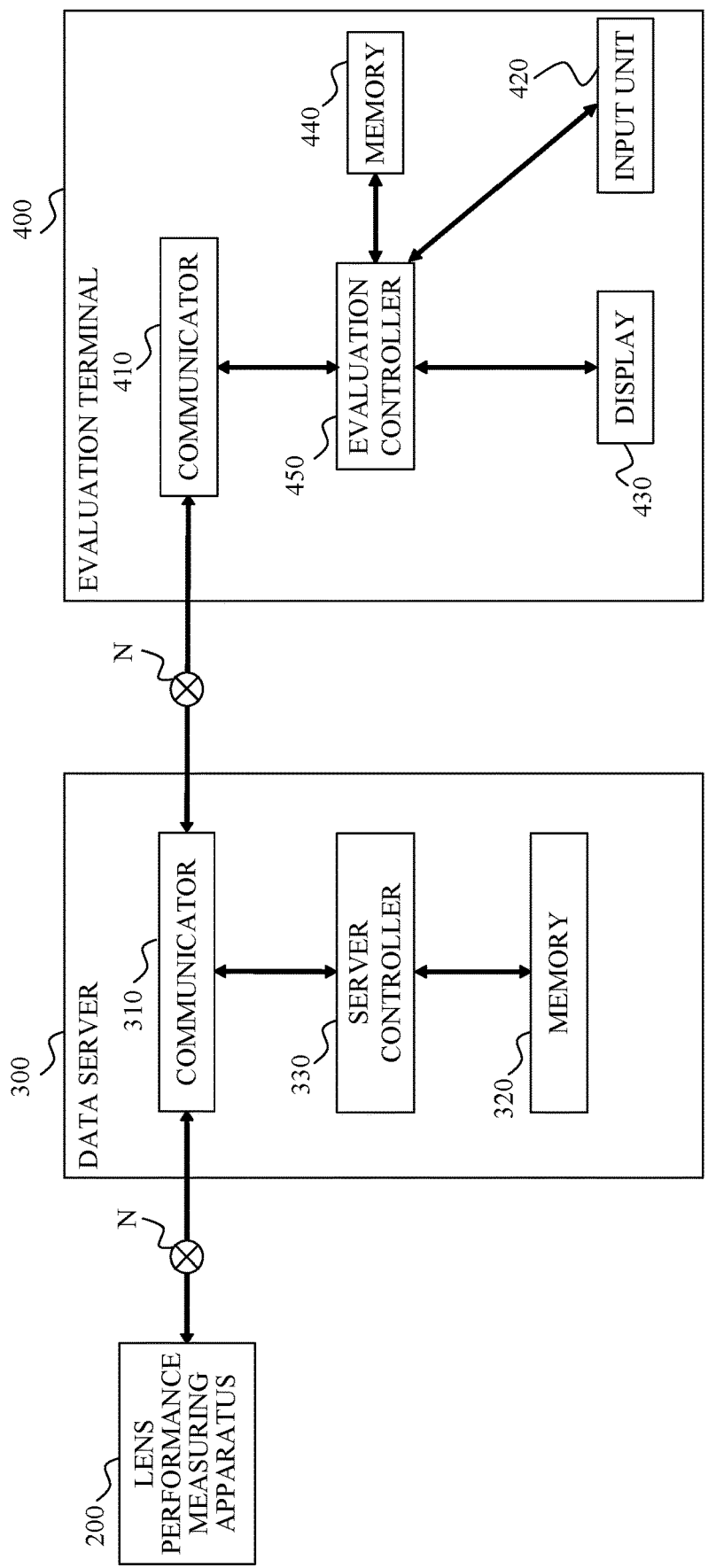
FIG. 4 illustrates structures of a data server and an evaluation terminal in this embodiment.

FIG. 4 illustrates detailed structures of the data server 300 and the evaluation terminal 400. The data server 300 includes a communicator 310 that enables communications with the lens performance measuring apparatus 200 and the evaluation terminal 400, a memory 320 that saves various data described later, and a server controller 330 that controls the entire data server by managing individual information and other information.

The evaluation terminal 400 includes a communicator 410 that enables a communication with the data server 300, an input unit 420 that inputs various information, a display (unit) 430, a memory 440 that stores evaluation results, and an evaluation controller 450 that controls the entire evaluation terminal 400 and evaluates the interchangeable lens 100.

The evaluation controller 450 transmits and receives various data to and from the data server 300 via the network N and the communicator 410. The evaluation controller 450 can also communicate with the lens performance measuring apparatus 200 via the network N and the communicator 410, and acquires ID information from the interchangeable lens 100 installed in the lens performance measuring apparatus 200, and acquires performance measurement data and performance reference data corresponding to the ID information from the data server 300. The performance reference data corresponds to second data on the reference performance of the interchangeable lens 100, and includes shipment data (data in the shipment) and designed data (referred to as designed value data hereinafter) described later. The evaluation controller 450 evaluates the interchangeable lens 100 for various evaluation items input from the input unit 420 using the performance measurement data and the performance reference data, and displays the evaluation result on the display 430.

The evaluation terminal 400 and the data server 300 may be an integrated terminal. Although the data server 300 is a terminal for a system administrator, the evaluation terminal 400 may be a terminal for the system administrator or a terminal for the user (client).

This embodiment discusses a lens evaluating system for evaluating interchangeable lenses, but may form an optical apparatus evaluating system so as to evaluate an accessory such as a lens interchangeable type camera, a lens integrated type camera, an extender, and an optical filter.

Next follows a detailed description of a data format of the data saved in the data server 300. FIG. 13 is an illustrative table data showing percentage data (referred to as MTF % data hereinafter) at each image plane position of the MTF (modulation transfer function), which is one of indexes showing the optical performance of the interchangeable lens. The table data is expressed as follows.

Table [001]"y, z" (x, Co, f, Z, Fo, Iris, g, Di, Ad, Disc)

In the above table data, Table indicates that it is table data, and the number in [ ] indicates the serial number of the data in the table data. 001 indicates MTF % data. A character in " " is a main variable of the table data, and indicates that the size of the two-dimensional table is an array of y row×z column. In the following description, the unit of the number of table data is set to a "sheet." The character in ( ) indicates a subvariable, and indicates that there are as many table data as the number of subvariable combinations.

Next, each variable will be explained. y and z indicate a position of the interchangeable lens mounted on the lens performance measuring apparatus, where y is a vertical position and z is a horizontal position based on the position of the interchangeable lens when it is mounted on the lens performance measuring apparatus 200. In this embodiment, y and z indicate positions that are equally divided into 64 in each direction. x indicates a position (mm) in the optical axis direction, and where the position of the imaging plane is set to 0, the image plane side is set to +, and the object side is set to −. The movement in the optical axis direction may be made by moving the imaging plane, by changing the object distance, by moving the focus lens, or the like.

Co is a color (wavelength) of the light source used in the measurement, and this embodiment uses a specific spectral waveform as white light. f is a spatial frequency (pieces/mm), Z is a focal length (mm), Fo is an object distance (m), Iris is an aperture value (F-number), and g is a direction in which gravity acts. Di indicates a direction of a monochrome chart line in the MTF measurement, and is generally distinguished by an expression such as a sagittal direction and a meridional direction or a vertical line and a horizontal line. Ad indicates the presence or absence of an adapter represented by an extender. Disc is determination data (data for determination use) used to determine when and where the MTF measurement was made, whether it is the shipment data or designed value data, and the like.

The data format is not limited to this example, and may be represented by an RO coordinate system instead of yz, or Fo may be set to a position of the focus lens instead of the object distance.

Next follows the illustrative table data used to evaluate the optical performance of the interchangeable lens 100. This table data is expressed as a weighting table data of MTF % data as follows.

Table [002] "y, z" (x, Co, f, Z, Fo, Iris, g, Di, Ad)

This Table [002] is used to calculate the weighted average in the performance evaluation. For example, variables x=−1, 0, +1 are set, and the weight of the in-focus position x=0 is set to 1, at which the interchangeable lens 100 is in focus when the other variables have specific values. The weight of the front position x=−1 is set to 0.5 relative to the in-focus position, and the weight of the back position x=+1 is set to 0.3 relative to the in-focus position. When x is combined with the variable Iris, it also becomes a parameter for evaluating so-called bokeh (blur), and the optical performance may gradually change from x=0. In particular, under the condition with a shallow depth and a large focal length Z, the weight of x=−1 can be increased up to 0.4 or the like. When the object distance Fo is ∞, since there is usually no object farther than infinity, the weight of x=−1 is set to 0 and the weight of x=+1 is set to 0.7. Various weighting methods may be adopted depending on the variable.

Co is a color (wavelength) of the light source used in the measurement, and is a variable for distinguishing blue light as short wavelength light, red light as long wavelength light, or white light as a mixture of other wavelengths. When a large difference occurs where Co is changed with x=0, x=−1 and x=+1, a large longitudinal chromatic aberration occurs. When the performance greatly changes depending on Co in a range with large absolute values of y and z (=near the edge of the measurement image data), a large lateral chromatic aberration occurs. In a telephoto lens, weighting is made so as to increase the weight of the chromatic aberration according to the characteristic for each interchangeable lens model.

It is common for a digital camera to correct the chromatic aberration with an image processing system. However, when the optical performance changes from the designed value or that in the shipment, a correction will fail in the image processing and thus a performance comparison between the shipment and the use (measurement) is effective in evaluating the imaging performance including the image processing system.

This embodiment stores Table [002] in the data server 300 as a representative value for each model of the interchangeable lens. Alternatively, another data may be used or a weighted amount may be changed according to the information from the input unit 420 of the evaluation terminal 400. The other data, as used herein, is, for example, data for comparison with another lens having the same focal length, and "resolution priority," "bokeh priority," and "distortion priority" according to the user's preference. More specifically, the weight may be determined based on not only single aberration information, such as "center resolution priority" and "peripheral resolution priority" but also the coordinate in the image sensor.

FIG. 14 shows an illustrative table data used to evaluate the mechanical driving performance of the interchangeable lens 100. The shown table data is a table data on a vibration type motor (USM) using a piezoelectric element as the ACT 120 (focus actuator) for moving the focus lens in the interchangeable lens. This table data stores a driving speed relative to a driving frequency, which is one of the control commands, and is expressed as follows.

Table [010] "f, Di" (T, g, Disc)

In the table data of this driving speed data, the number 010 in [ ] is the driving speed data of the vibration type motor with the driving frequency f and the driving direction Di being main variables. A character in ( ) indicates a subvariable, and means that there are as many table data as the number of combinations of subvariables.

Next, each variable will be described in detail. f is a driving frequency for controlling the vibration type motor, and is represented by a frequency range divided into 30 to the minimum value in 100 Hz increments on the basis of the maximum value in the frequency range. In general, in the vibration type motor using the piezoelectric element, when the frequency is gradually changed from the high frequency side or the low frequency side toward the resonance frequency, the amplitude increases as the frequency approaches to the resonance frequency, and the driving speed can be increased. This embodiment provides a control so as to increase the driving speed by gradually lowering the driving frequency from the high frequency side of the resonance frequency. When the driving frequency becomes lower than the resonance frequency, the driving speed sharply drops and becomes uncontrollable.

Di is a driving direction of the focus actuator, where the driving direction during focusing from the close object to the object at infinity is set to 0, and the driving direction during focusing from the object at infinity to the close object is set to 1. T is a temperature and indicates an environmental temperature in the measurement. FIG. 14 shows a measurement example at 23° C. Since the characteristics of the vibration type motor are likely to change under the high temperature environment and the low temperature environment, this embodiment acquires data at the high temperature and data at the low temperature in the performance evaluation. g is a gravity acting direction, and Disc is determination data for determining when and where the measurement of the vibration type motor was made, whether it is the shipment data or the designed value data, and the like.

This embodiment has discussed the MTF % data and the driving speed data of the focus actuator, but the evaluation items of the interchangeable lens are not limited to the MTF and the driving speed of the focus actuator, and there are various data. For example, the data on the optical performance includes such items as amounts of peripheral illumination drop and the distortion from the optical axis, an amount of the lateral chromatic aberration, an amount of the curvature of field calculated from the MTF, a lens aspherical amount, the surface accuracies of the spherical and aspherical lenses, and wavefront data of the lens transmitting light. The mechanical driving performance data includes data of the F-number relative to the driving amount of the diaphragm actuator, data of the shift amount of the image stabilizing lens relative to an amount of electricity supplied to the voice coil motor as the image stabilizing actuator, and the like.

Figure 5:
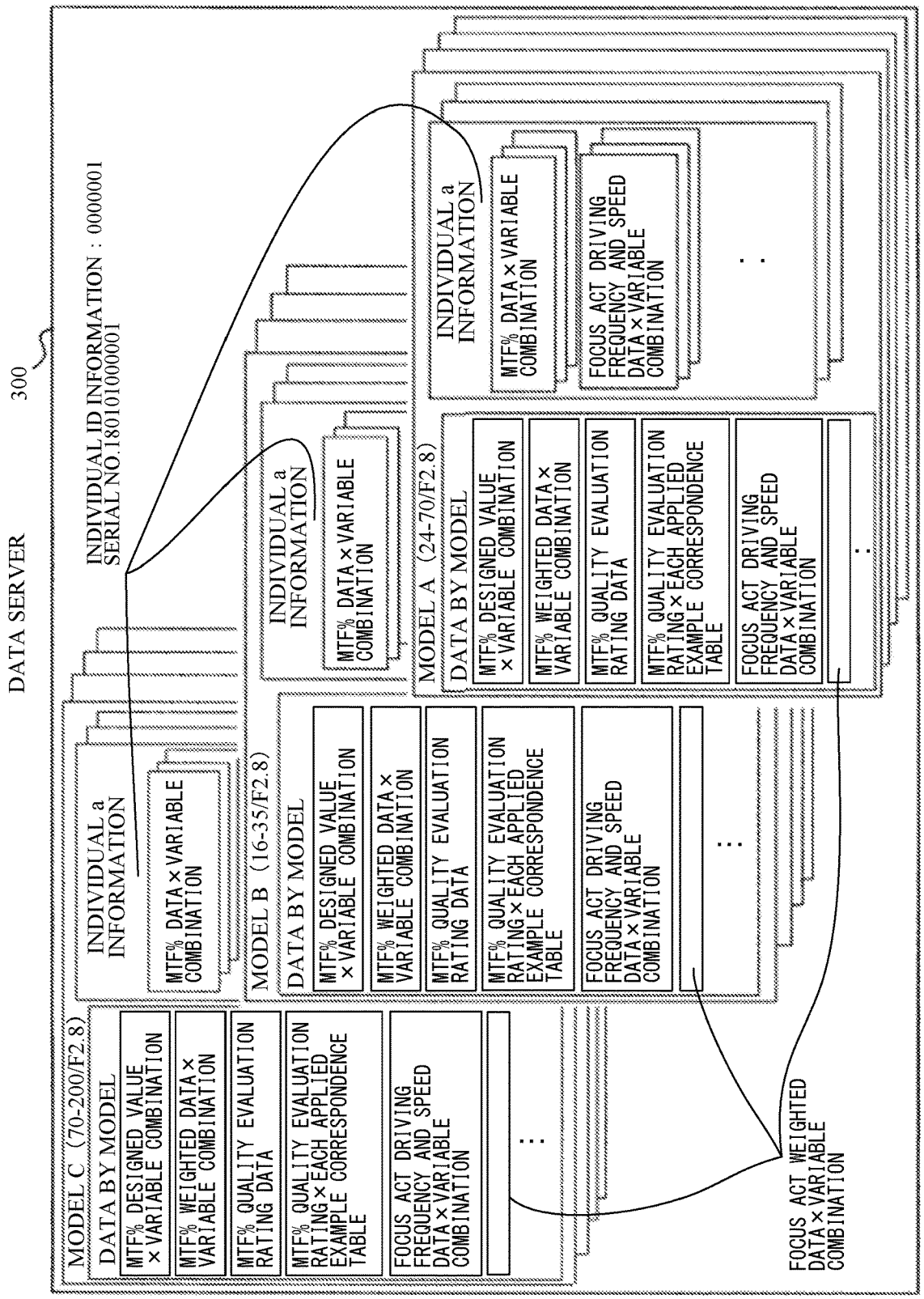
FIG. 5 illustrates a data storage structure on the data server according to this embodiment.

FIG. 5 shows a data storage structure on the data server 300. On the data server 300, data is stored for each model of the interchangeable lens, and is further divided into data unique to each model and data for each individual of the same model. The data unique to each model, as used herein, is a designed value of each evaluation item and weighted data in the evaluation (measurement) for each evaluation item. The data for each individual is data for each evaluation (measurement) of the interchangeable lens held by a certain user.

Next follows a description of evaluation processing of the interchangeable lens using the MTF % data stored in the data server 300. This embodiment uses three MTF % data: "shipment (time)" at the factory shipment time, "designed value" having no manufacturing errors unlike the shipment time, and "evaluation (time)" for a measurement after the shipment (use). In the following, each MTF % data will be abbreviated as follows:

Shipment Data:
Table [001] "y, z" (x, Co, f, Z, Fo, Iris, g, Di, Ad, shipment)→Table [001] (shipment)

Designed Value Data:
Table [001] "y, z" (x, Co, f, Z, Fo, Iris, g, Di, Ad, designed value)
→Table [001] (designed value)

Evaluation Data:
Table [001] "y, z" (x, Co, f, Z, Fo, Iris, g, Di, Ad, evaluation) Table [001] (evaluation)

This embodiment calculates a ratio of Table [001] (evaluation) and Table [001] (shipment or designed value) using the following expressions (1) and (2) in order to calculate the deterioration degree of the interchangeable lens.

$$\text{Table [001] (evaluation)/Table [001] (shipment)} \times 100 = AAA \quad (1)$$

$$\text{Table [001] (evaluation)/Table [001] (designed value)} \times 100 = BBB \quad (2)$$

The variables indicated in the expressions (1) and (2) and the subsequent expressions have the same values. The expression (1) expresses by percentage the deterioration degree AAA of the performance of the interchangeable lens in the evaluation from that in the shipment. The expression (2) expresses by percentage the deterioration degree BBB of the designed value of the performance of the interchangeable lens in the evaluation from that in the designed value.

Next, the deterioration degrees AAA' and BBB' are calculated by calculating the following expressions (3) and (4) using Table [002] for weighting with each variable.

$$AAA \times \text{Table[002]"y,z"}(x, Co, f, Z, Fo, \text{Iris}, g, Di, Ad) = AAA' \quad (3)$$

$$BBB \times \text{Table[002]"y,z"}(x, Co, f, Z, Fo, \text{Iris}, g, Di, Ad) = BBB' \quad (4)$$

By applying the deterioration degrees AAA' and BBB' as the weighted average values weighted by each variable to the performance evaluation classification illustrated in FIG. 15, rating is made as the performance evaluation result regarding the MTF % data from the high evaluation side (with the low deterioration degree) in rating (grade) order of S, A, B, and C. In the performance evaluation classification, ratings are classified according to the combination of AAA' and BBB'. According to the performance evaluation result, for example, in the used market of interchangeable lenses, as illustrated in FIG. 15, rating is made such as "near mint (almost brand new)", "low deterioration" and "high deterioration."

Figure 1:
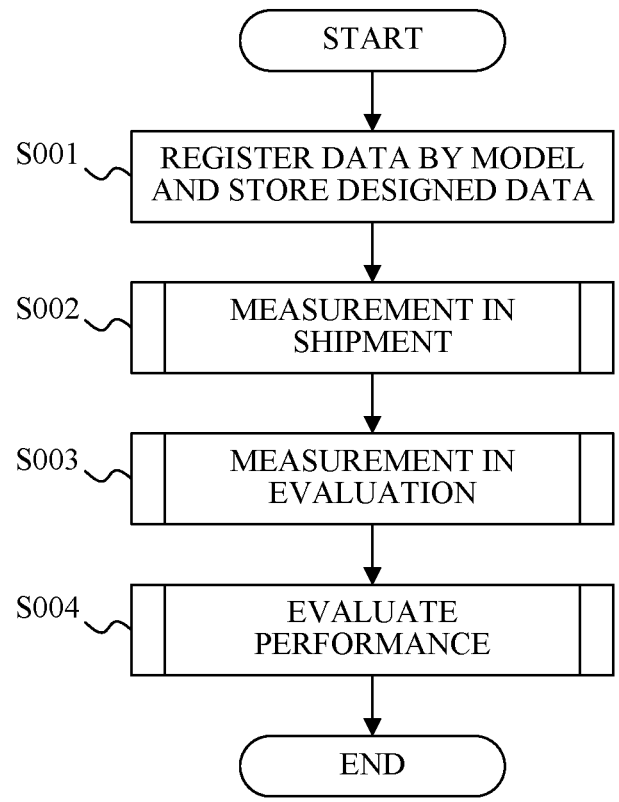
FIG. 1 is a flowchart showing lens measurement and evaluation processing according to this embodiment of the present invention.

The flowchart in FIG. 1 shows a flow of lens measurement and evaluation processing (optical apparatus evaluating method) performed from the shipment to the evaluation for a certain individual of the interchangeable lens (individual optical apparatus: referred to as an individual lens hereinafter). S in the figure means the step. Although the lens measurement and evaluation processing using the MTF % data will be described here, the same processing is also performed in the lens measurement and evaluation processing using the above mechanical drive performance data and other performance data. First, S001 as a preparatory step registers the data format, data type, each variable, and the like for each model of the interchangeable lens in the data server 300. Table [001] (designed value) as the designed value data having no manufacturing error for each model is stored in the data server 300.

In S002, the lens performance measuring apparatus 200 measures the individual lens 600 in the shipment, acquires Table [001] (shipment), and stores it in the data server 300.

In S003, the lens performance measuring apparatus 200 measures the individual lens 600 in the shipment and acquires Table [001] (evaluation).

In S004, the evaluation terminal 400 evaluates the lens individual 600 using Table [001] (shipment) and Table [001] (designed value) and Table [001] (evaluation) read from the data server 300.

Figure 6:
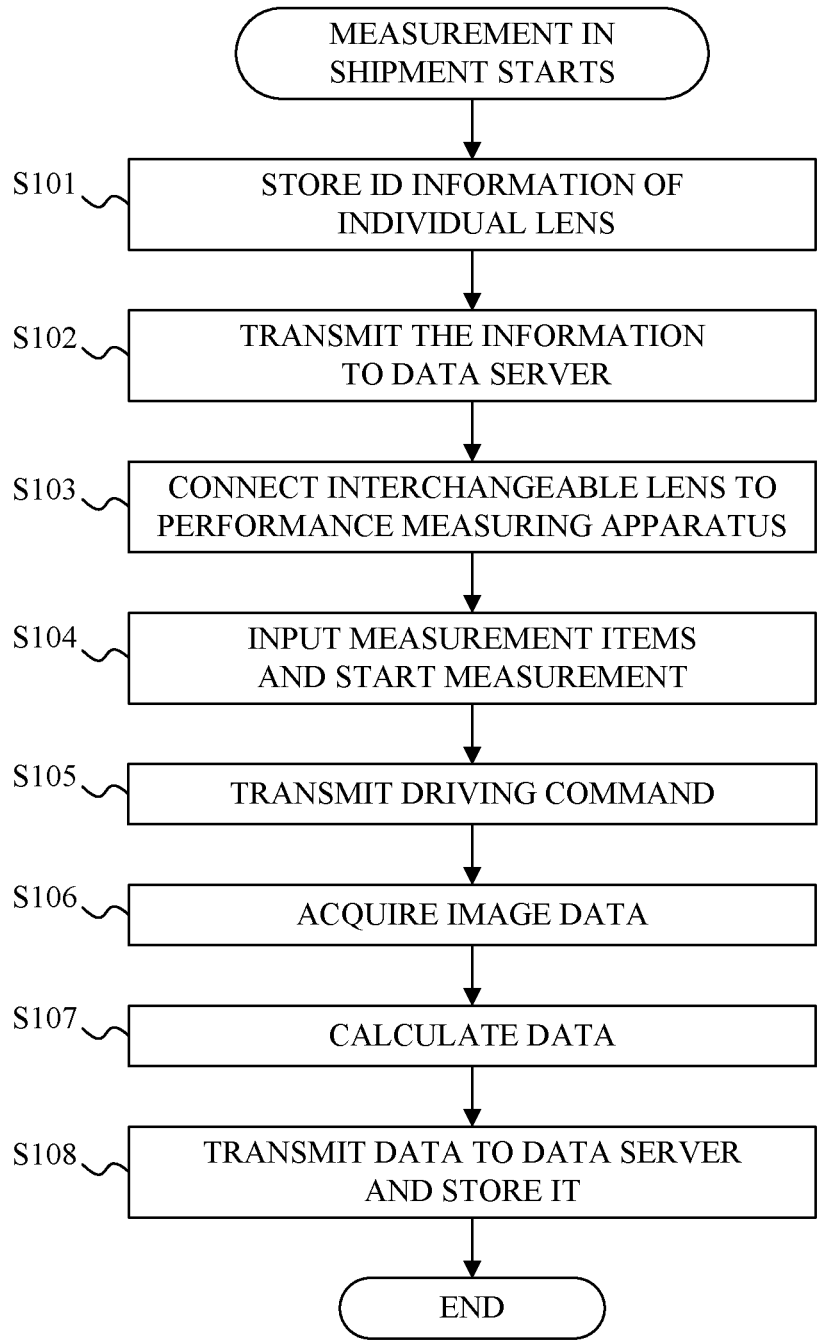
FIG. 6 is a flowchart showing measurement processing in a shipment according to the embodiment.

FIG. 6 shows a flow of measurement processing in the shipment for the individual lens 600 performed in S002. In S101, the ID information unique to the individual lens 600 is stored in the internal memory 140 of the individual lens 600. At this time, a serial number such as the manufacture number of the individual lens 600 is printed on the exterior member of the individual lens 600, and the serial number is also associated with the ID information and stored in the internal memory 140. The ID information and the serial number may be the same.

In S102, the ID information and the serial number stored in the internal memory 140 in S001 are transmitted to the data server 300. Thereby, a data storing region for the individual lens 600 is created on the data server 300.

In S103, the individual lens 600 is mechanically and electrically connected to the lens performance measuring apparatus 200 (measurement camera 230), and the ID information and the serial number stored in the internal memory 140 of the individual lens 600 are stored in the measurement memory 244 of the measurement terminal 240 through the lens controller 160, the camera controller 235, and the measurement controller 245.

In S104, the input unit 246 of the measurement terminal 240 inputs measurement items, measurement conditions, and measurement starting timings. In response, the measurement controller 245 of the measurement terminal 240 starts measuring the individual lens 600.

In S105, the measurement controller 245 transmits a driving command for causing the lens individual 600 to perform the measuring operation through the measurement camera 230.

In S106, the measurement controller 245 acquires the image data acquired by the measurement camera 230 according to the measuring operation of the individual lens 600, and stores it in the measurement memory 244.

In S107, the measurement controller 245 generates MTF % data using the image data stored in the measurement memory 244, and stores it in the measurement memory 244.

In S108, the measurement controller 245 transmits the ID information, serial number, and MTF % data of the individual lens 600 to the data server 300. The data server 300 stores these data in the data storing region for the individual lens 600 created in S102. This is the flow from when the individual lens 600 is manufactured in the factory and to when it is shipped.

Figure 7:
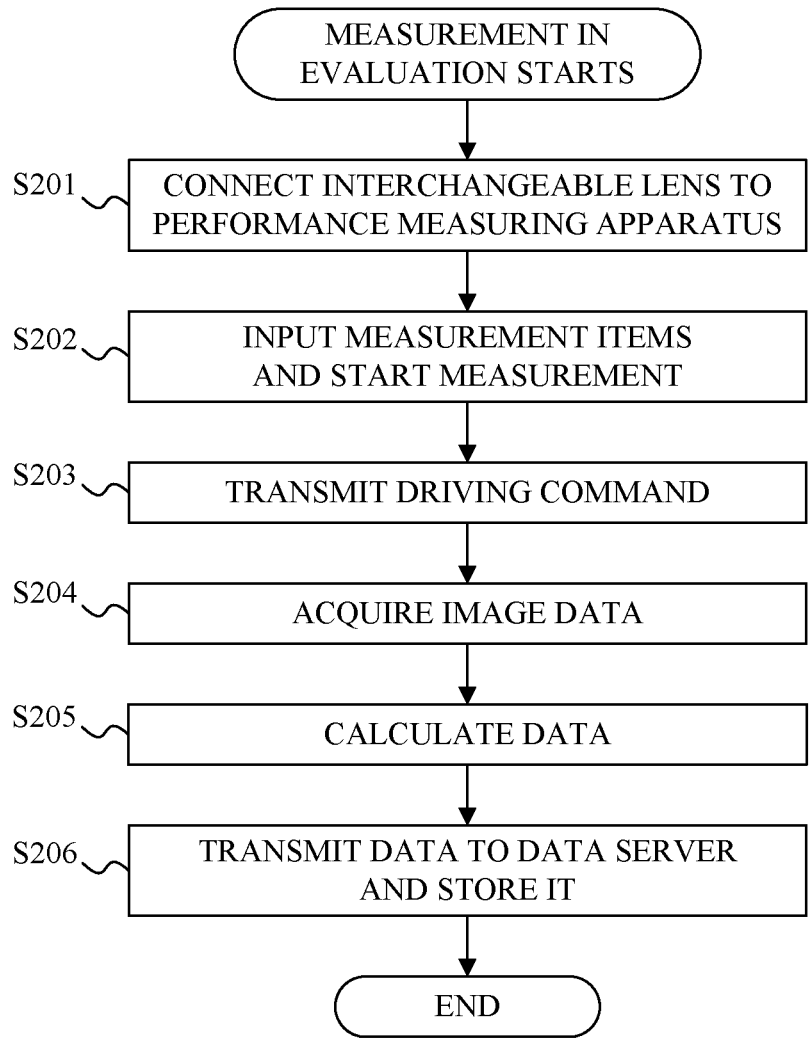
FIG. 7 is a flowchart showing measurement processing in an evaluation according to the embodiment.

FIG. 7 shows a flow of evaluation processing of the individual lens 600, which is performed at an arbitrary timing after the shipment. In S201 to S206, the processes of S103 to S108 of FIG. 6 are performed. At this time, the lens performance measuring apparatus 200 may be installed in a factory or a place other than the factory (such as a shop dealing with used interchangeable lenses).

Figure 8:
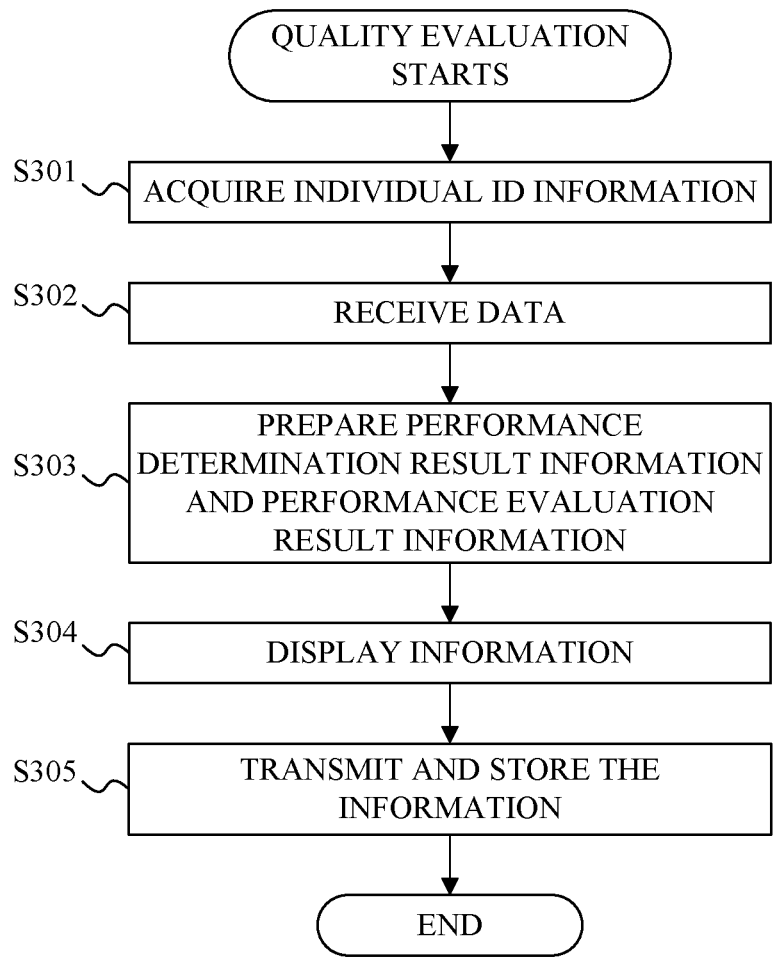
FIG. 8 is a flowchart showing evaluation processing according to the embodiment.

A flowchart in FIG. 8 shows a flow of evaluation processing of the individual lens 600. The evaluation terminal 400 serving as a computer executes the processes of S301 to S304 according to a computer program. Like the lens performance measuring apparatus 200, the evaluation terminal 400 may be installed in a factory or a place other than the factory.

In S301, the evaluation controller (first acquirer, second acquirer, and evaluator) 450 in the evaluation terminal 400 acquires the ID information of the lens individual 600 from the lens performance measuring apparatus 200 to which the lens individual 600 to be evaluated is attached.

In S302, the evaluation controller 450 transmits the acquired ID information to the data server 300, and acquires Table [001] (shipment), Table [001] (designed value), and Table [001] (evaluation) of the individual lens 600 corresponding to the evaluation item (which is the MTF in this example) input from the data server 300 by the input unit 420 in the evaluation terminal 400.

In S303, the evaluation controller 450 calculates the deterioration degrees AAA' and BBB' using Table [001] (shipment), Table [001] (designed value), Table [001] (evaluation), and Table [002], and selects the performance evaluation result corresponding to the deterioration degree.

In S304, the evaluation controller 450 displays the selected performance evaluation result on the display 430, and transmits the performance evaluation result together with the ID information to the data server 300.

In S305, the data server 300 stores the received performance evaluation result in association with the ID information of the individual lens 600.

Figure 9:
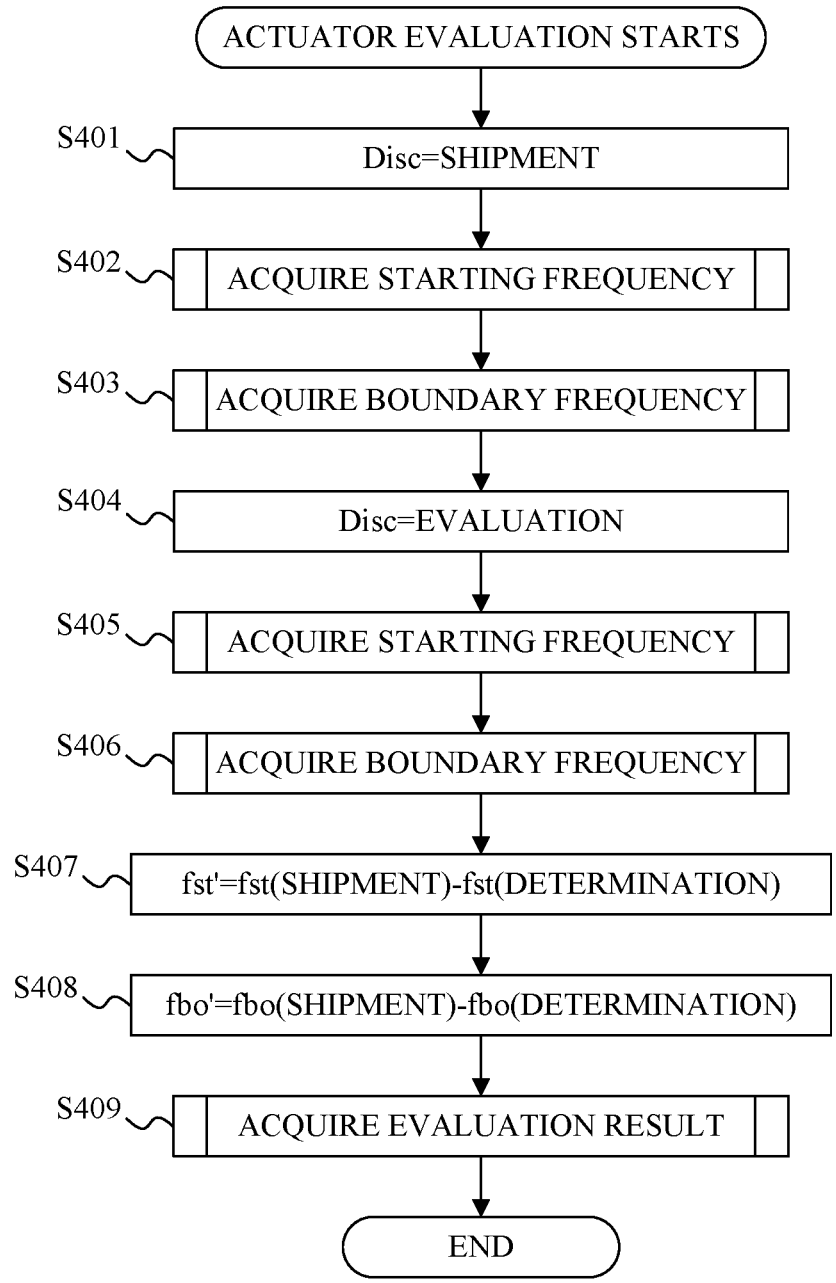
FIG. 9 is a flowchart showing measurement and evaluation processing of a focus actuator according to this embodiment.

Next, FIG. 9 shows a flow of measurement and evaluation processing of the driving performance of the focus actuator in the individual lens 600. First, in S401, the evaluation terminal 400 sets "shipment (time)" to Disc.

In S402 and S403, the evaluation controller 450 reads out Table [010] "fa, Di" (T, g, shipment) of the lens individual 600 already stored in the data server 300, and acquires the starting frequency fst (shipment) and the boundary frequency fbo (shipment) in the shipment using it.

In S404, the evaluation controller 450 sets "evaluation (time)" to Disc.

In S405 and S406, the evaluation controller 450 reads out Table [010] "fa, Di" (T, g, evaluation) of the lens individual 600 already stored in the data server 300, and acquires the starting frequency fst (evaluation time) and the boundary frequency fbo (evaluation time) in the evaluation using it.

Figure 10:
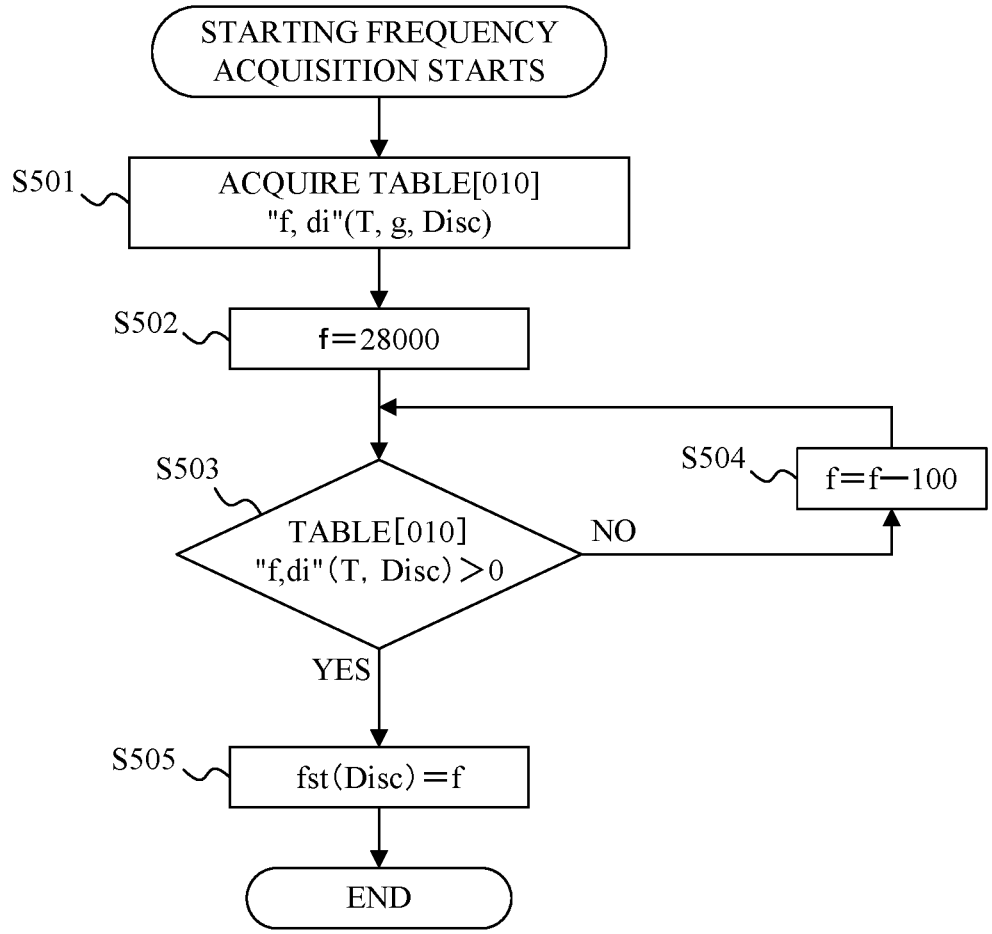
FIG. 10 is a flowchart showing starting frequency acquisition processing of the focus actuator according to this embodiment.

A flowchart in FIG. 10 shows a flow of starting frequency acquisition processing in which the evaluation controller 450 acquires the starting frequency fst (Disc) in S402 and S405. In this processing, it acquires the driving frequency as the starting frequency fst (Disc) by lowering the driving frequency f of the focus actuator from 28000 Hz by 100 Hz each time, when Table [010] "f, Di" (T, g, Disc) is larger than 0 or when the focus actuator start being driven. Here, a description of setting variables other than Disc will be omitted.

First, in S501, the evaluation controller 450 acquires Table [010] "f, Di" (T, g, Disc) from the data server 300.

In S502, the evaluation controller 450 sets the driving frequency f to 28000 Hz.

In S503, the evaluation controller 450 determines whether or not the value of Table [010] "28000, Di" (T, g, Disc) is larger than 0, and if it is larger, it proceeds to S505, otherwise (=0), it proceeds to S504.

In S504, the evaluation controller 450 sets f=f−100, then returns to S503, and determines again whether or not the value of Table [010] "f−100, Di" (T, g, Disc) is larger than 0.

In S505, the evaluation controller 450 acquires the driving frequency f when Table [010] "f, Di" (T, g, Disc) is larger than 0 in S503, as the starting frequency fst (Disc).

Figure 11:
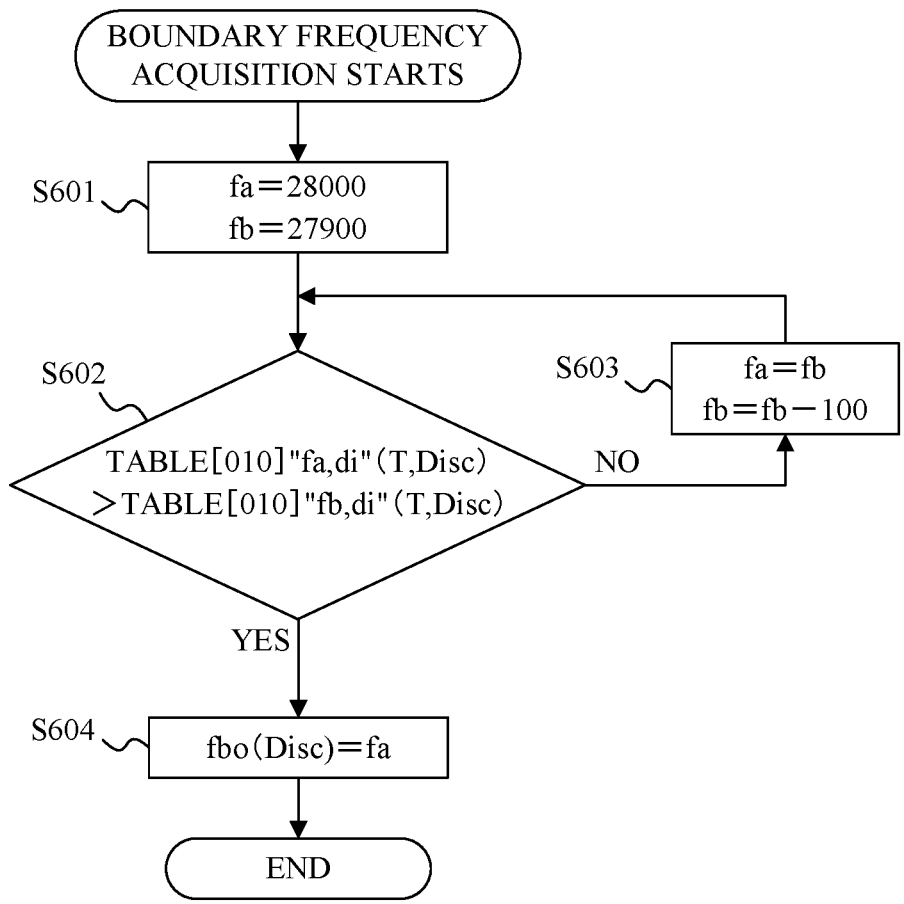
FIG. 11 is a flowchart showing a boundary frequency acquisition processing of the focus actuator according to this embodiment.

A flowchart in FIG. 11 shows a flow of boundary frequency acquisition processing in which the evaluation controller 450 acquires the boundary frequency fbo (Disc) in S403 and S406. The boundary frequency is a driving frequency just before the driving speed, which has been increasing as the driving frequency of the focus actuator is lowered, starts decreasing (near the resonance frequency). More specifically, where fa is a certain driving frequency and fb is a driving frequency lowered by 100 Hz from fa, the evaluation controller 450 acquires as the boundary frequency fbo (Disc) the driving frequency fa when Table [010] "fa, Di" (T, g, Disc) is larger than Table [010] "fb, Di" (T, g, Disc).

First, in S601, the evaluation controller 450 sets fa to 28000 Hz and fb to 27900 Hz.

In S602, the evaluation controller 450 determines whether or not Table [010] "fa, Di" (T, g, Disc) is larger than Table [010] "fb, Di" (T, g, Disc). If so, it proceeds to S604, otherwise it proceeds to S603.

In S603, the measurement controller 245 sets fa=fb and fb=fb−100, then returns to S602, and determines whether or not Table [010] "fa, Di" (T, g, Disc) is larger than Table [010] "fb, Di" (T, g, Disc).

In S604, the measurement controller 245 acquires fa as the boundary frequency fbo (Disc).

In S407 in FIG. 9, the evaluation controller 450 calculates a difference fst' between fst (shipment) and fst (evaluation) as fst'=fst (evaluation)−fst (shipment).

In S408, the evaluation controller 450 calculates a difference fbo' between fbo (shipment) and fbo (evaluation) as fbo'=fbo (evaluation)−fbo (shipment). When fst' and fbo' are positive, it means that each frequency in the evaluation has changed to the high frequency side from that in the shipment, and when they are negative, it means that each frequency in the evaluation has changed to the low frequency side.

Figure 12:
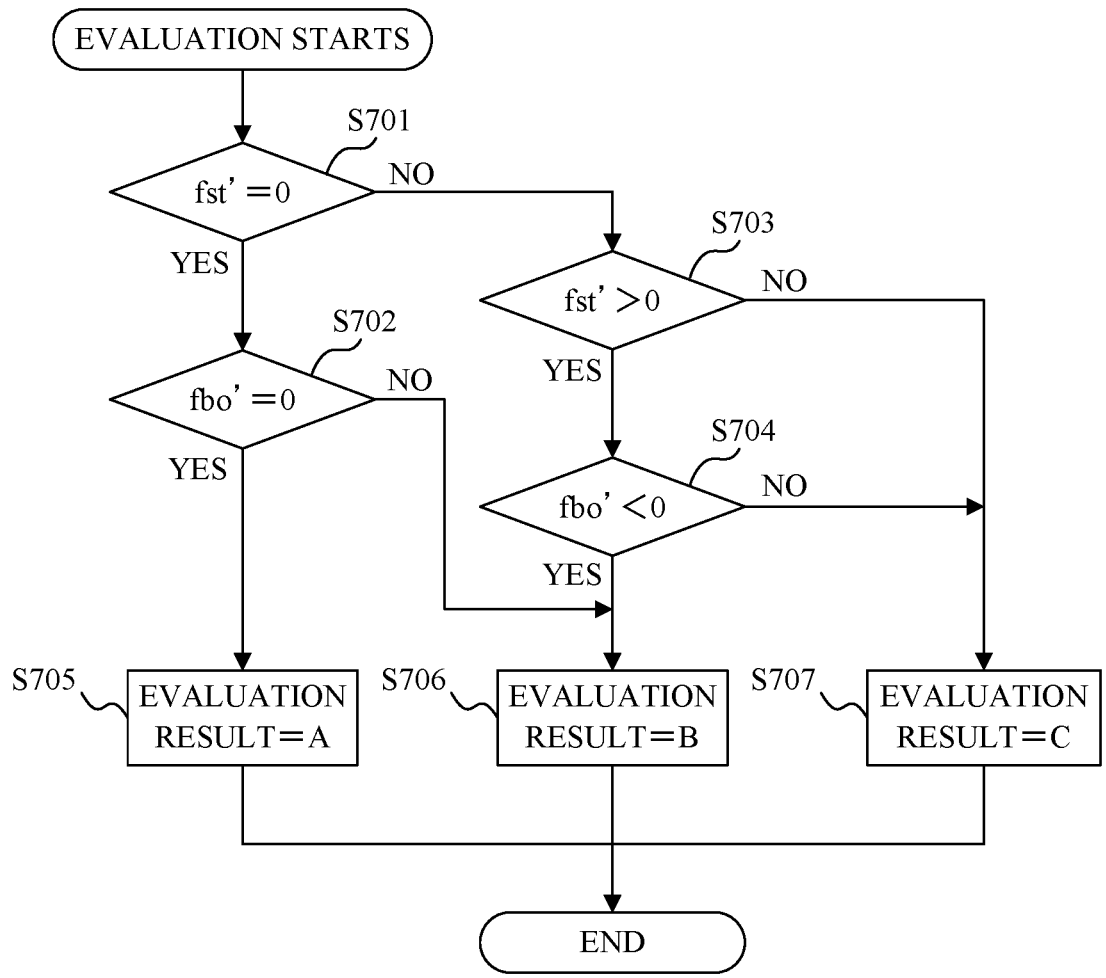
FIG. 12 is a flowchart showing evaluation processing of the focus actuator according to this embodiment.

Next, in S409, the evaluation controller 450 evaluates the individual lens 600 (focus actuator) using fst' and fbo'. A flowchart in FIG. 12 shows a flow of the evaluation processing performed by the evaluation controller 450 in S409. In this processing, when fst' and fbo' are less than ±100 Hz, which is the measurement pitch of each of the starting frequency and the boundary frequency, each of fst' and fbo' is considered to be zero (fst'=0, fbo'=0). Then, when fst' and fbo' are positive or larger than +100 Hz, each of fst' and fbo' is considered to be larger than 0 (fst'>0, fbo'>0), and when they are negative or less than −100 Hz, each of fst' and fbo' is considered to be less than zero (fst'<0, fbo'<0).

First, in S701, the evaluation controller 450 determines whether or not fst'=0, and if fst'=0, it proceeds to S702, otherwise it proceeds to S703.

In S702, the evaluation controller 450 determines whether or not fbo'=0, and if fbo'=0, it proceeds to S705, otherwise it proceeds to S706.

In S705, the evaluation controller 450 determines that fst'=0 and fbo'=0, the starting frequency and the boundary frequency have hardly changed, and the focus actuator has not deteriorated, and sets the performance evaluation result to grade A (used product rating "almost new") as shown in the performance evaluation classification in FIG. 16.

On the other hand, in S703, the evaluation controller 450 determines whether or not fst'>0, and if fst'>0, it proceeds to S704, otherwise it proceeds to S707.

In S704, the evaluation controller 450 determines whether or not fbo'<0, and if fbo'<0, it proceeds to S706, otherwise it proceeds to S707.

In S706, the evaluation controller 450 determines that fst'>0 and fbo'<0, and that the driving frequency and the boundary frequency have changed but have little influenced the driving control of the focus actuator. Therefore, the evaluation controller 450 sets the performance evaluation result to grade B (used product rating "low deterioration") as shown in FIG. 16.

In S707, the evaluation controller 450 determines that neither fst'=0 and fbo'=0 nor fst'>0 and fbo'<0, and that at least one of the starting frequency and the boundary frequency has changed from that in the shipment so as to restrict the driving control of the focus actuator. Therefore, the evaluation controller 450 sets the performance evaluation result to grade C (used product rating "large deterioration") as illustrated in FIG. 16.

The evaluation controller 450 displays the above performance evaluation result on the display 430 and transmits it to the data server 300. The data server 300 stores the received performance evaluation result in association with the ID information of the individual lens 600.

Evaluating the performance of the actuator in this way can quantitatively evaluate actuators that are difficult to evaluate in absolute value due to individual variations. In particular, the vibration type motor used as the focus actuator in this embodiment significantly affects the controllability of the focus lens when each of the starting frequency and the boundary frequency changes. This embodiment can accurately evaluate the performance according to the degree of influence on the controllability of the focus lens.

The above embodiment can accurately evaluate the performance of the interchangeable lens using the MTF % data in the shipment (and the designed value), the driving speed data of the actuator, and the data in the evaluation. When the accuracy of the performance evaluation improves, it is possible to improve the objectivity of price assessment of used interchangeable lenses, to improve the accuracy of estimating the repair price and processing time of repaired products, and to easily specify a breakdown location.

In addition, this embodiment stores a large amount of data used for the performance evaluation in the data server, and thus does not require each interchangeable lens to have a memory for storing this data. The manufacturer can refer to the data stored in the data server and utilize it for product improvement and development.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiment can evaluate the performance of the optical apparatus with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-068987, filed on Apr. 7, 2020 which is hereby incorporated by reference herein in its entirety.

What is claimed is:

1. A lens apparatus evaluating method comprising the steps of:
   acquiring first data on a performance of the lens apparatus, which changes along with use of the lens apparatus, the first data including an aberration of the lens apparatus after use of the lens apparatus;
   acquiring second data on a first reference performance of the lens apparatus, the second data including an initial aberration of the lens apparatus before use of the lens apparatus;
   acquiring third data on a design performance of the lens apparatus, the third data including predefined reference aberration of the lens apparatus as designed; and
   determining a deterioration degree of the performance of the lens apparatus using the first data, the second data, and the third data.

2. The lens apparatus evaluating method according to claim 1, wherein the deterioration degree of the performance of the lens apparatus is determined according to a ratio or difference between the first data and the second data and the first data and the third data.

3. The lens apparatus evaluating method according to claim 1, wherein the first data, the second data, and the third data are acquired from a server configured to store the first data, the second data, and the third data for each individual lens apparatus, using identification information configured to identify each individual lens apparatus.

4. The lens apparatus evaluating method according to claim 1, wherein the second data includes data on a performance of the lens apparatus at a time of factory shipment.

5. The lens apparatus evaluating method according to claim 1, wherein the first data, the second data, and the third data include data on optical performance of the lens apparatus.

6. The lens apparatus evaluating method according to claim 1, wherein the data, the second data, and the third data include data on a mechanical driving performance of the lens apparatus.

7. A non-transitory computer-readable storage medium storing a computer program that causes a computer to execute the lens apparatus evaluating method according to claim 1.

8. The lens apparatus evaluating method according to claim 1, wherein the first reference performance of the second data includes an aberration of the lens apparatus that is measured at a time of factory shipment.

9. A lens apparatus evaluating apparatus comprising:
- a first acquirer configured to acquire first data on a performance of the lens apparatus, which changes along with use of the lens apparatus, the first data including an aberration of the lens apparatus after use of the lens apparatus;
- a second acquirer configured to acquire second data on a first reference performance of the lens apparatus, the second data including an initial aberration of the lens apparatus before use of the lens apparatus;
- a third acquirer configured to acquire third data on a design performance of the lens apparatus, the third data including predefined reference aberration of the lens apparatus as designed; and
- an evaluator configured to determine a deterioration degree of the performance of the lens apparatus using the first data, the second data, and the third data.

10. A lens apparatus evaluating system comprising:
the lens apparatus evaluating apparatus according to claim 9;
a measuring apparatus configured to measure a performance of the lens apparatus and generate the first data; and
a server configured to store the first data, and second data, and the third data for each individual lens apparatus,
wherein the lens apparatus evaluating apparatus acquires the first data, second data, and the third data from the server.

* * * * *